United States Patent Office 3,450,008
Patented June 17, 1969

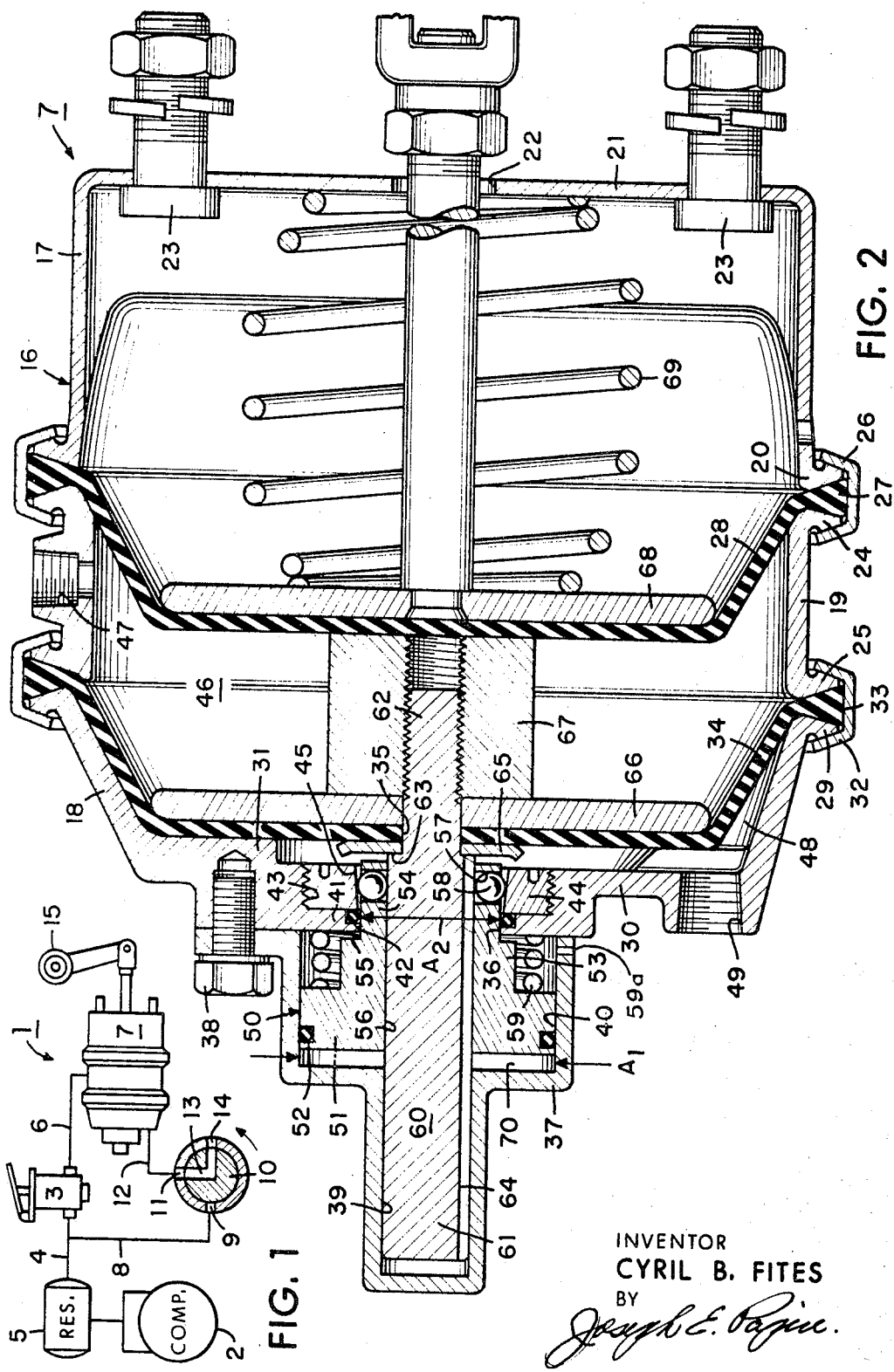

3,450,008
FRICTION DEVICE OPERATING MECHANISM
Cyril B. Fites, Florissant, Mo., assignor, by mesne assignments, to Wagner Electric Corporation, South Bend, Ind., a corporation of Delaware
Filed Oct. 27, 1966, Ser. No. 589,915
Int. Cl. F15b 15/26; F01b 7/04
U.S. Cl. 92—24                                                                                     1 Claim

ABSTRACT OF THE DISCLOSURE

Fluid pressure responsive means movable in a friction device operating mechanism and defining therewith an expansible fluid pressure chamber, said fluid pressure responsive means being movable in response to fluid pressure in said chamber toward an operative position, and a locking member movable in said chamber for locking engagement with said fluid pressure responsive means and having opposed differential areas respectively subjected to the fluid pressure in said chamber, said locking member being movable in response to fluid pressure in said chamber less than a predetermined value acting on said opposed differential areas into locking engagement with said fluid pressure responsive means in the operative position thereof.

---

This invention relates to fluid pressure systems and in particular to a friction device operating mechanism having locking means therein for retaining said friction device operating mechanism in its activated position if during a parking or emergency application the fluid pressure in the system drops below a predetermined value.

In the past, many friction device operating mechanisms have been provided with locking means which locked the friction device operating mechanism in the applied position when the fluid pressure in the system dropped below a predetermined value. However, these prior art friction device operating mechanisms had the undesirable feature of providing their locking means in the front end plate thereof and thereby required a separate fluid pressure supply to maintain the locking means thereof disabled during the normal service operation of the friction device operating mechanism.

It is therefore the general object of the present invention to provide a novel friction device operating mechanism which provides locking means in the rear end plate thereof so that said locking means is not affected during the normal service operation of the friction device operating mechanism.

Another object of the present invention is to provide a novel friction device operating mechanism which has the locking means thereof disabled during normal service operations.

Another object of the present invention is to provide a friction device operating mechanism having locking means therein which is maintained in its disabled position during normal operation and which during a parking or emergency application is effective to lock the friction device operating mechanism in its operative position when the fluid pressure in the system falls below a predetermined value.

These and other objects and advantages will become apparent hereinafter.

Briefly, the present invention comprises a friction device operating mechanism having a housing, fluid pressure responsive means movable in said housing and defining therewith an expansible fluid pressure chamber, said fluid pressure responsive means being movable in response to fluid pressure in said chamber toward an operative position, and locking means in said chamber engageable with said fluid pressure responsive means to maintain said fluid pressure responsive means in the operative position when the fluid pressure in said chamber falls below a predetermined value.

In the drawings which illustrate embodiments of the present invention,

FIG. 1 is a diagrammatic view of a vehicle friction device actuating system showing a friction device operating mechanism embodying the present invention therein, and FIG. 2 is an enlarged cross-sectional view of the friction device operating mechanism of FIG. 1 in its inoperative position.

Referring now to FIG. 1 in detail, a friction device actuating system, indicated generally at 1, is provided with fluid pressure generating means, such as a compressor 2, which is connected to the inlet side of an application valve 3 by a conduit 4, and a fluid pressure storage reservoir 5 is interposed in said conduit providing, in combination with the compressor 2, a source of fluid pressure. A conduit or service line 6 is connected between the outlet or service side of the application valve 3 and the service port of a friction device operating mechanism or actuating cylinder 7. Another conduit 8 has one end intersecting the conduit 4 between the reservoir 5 and the application valve 3 and the other end thereof is connected to an inlet 9 of a charging or control valve 10, and an outlet 11 of said charging valve is connected to the emergency port of the actuating cylinder 7 by a conduit 12. The charging valve 10 is provided with rotatable passage means 13 connecting the outlet 11 with an exhaust port 14 to vent said outlet to atmosphere; however, said rotatable passage means can be rotated counterclockwise (in the direction of the arrow) to position providing pressure fluid communication between the inlet 9 and the outlet 11. To complete the system 1, the push rod of the actuating cylinder 7 is connected with linkage means or an actuating ever, such as slack adjuster 15, for energizing a friction device (not shown).

Referring now to FIG. 2, the friction device operating mechanism 7 is provided with a housing, indicated generally at 16, including opposed cup-shaped end plates 17, 18 and an intermediate plate 19. The rightward or front end plate 17 is provided with a peripheral flange 20 adjacent the open end thereof and a base wall 21 having a centrally located venting aperture 22 therein. A plurality of mounting studs 23 are fixedly attached to the end wall 21 by suitable means, such as upset welds, for fixed connection with a mounting bracket (not shown) adjacent to the friction device. The intermediate plate 19 is provided with peripheral flanges 24, 25 on the opposed ends thereof, and a conventional clamping band 26 is provided in clamping engagement with the end plate flange 20 and the intermediate plate flange 24 to clamp a pheripheral bead 27 of a service diaphragm or fluid pressure responsive means 28 in sealable abutting engagement between the flanges 20 and 24. The leftward or rear end plate 18 is provided with a pheripheral flange 29 adjacent the open end thereof and a base wall 30 having a radial abutment or boss 31 thereon. A conventional clamping band 32 is provided in clamping engagement with the end plate flange 29 and the intermediate plate flange 25, and the compressive force of said clamping engagement serves to clamp a peripheral bead 33 of an emergency diaphragm or auxiliary fluid pressure responsive means 34 in sealable abutting engagement between the flanges 29 and 25. The auxiliary or emergency diaphragm 34 is provided with a centrally located aperture 35 which is substantially coaxial with the venting aperture 22 in the end plate 17, and a centrally located aperture 36 is provided in the base wall 30 in substantial alignment with the aperture 35.

A hub member 37 is connected to the base wall 30 radially outwardly of the aperture 36 in said base wall by suitable means, such as studs 38, and a bore and counterbore 39, 40 are provided in said hub member substantially coaxial with the aperture 36 in the base wall 30. The base wall 30, extending radially inwardly from the hub member 37, defines a shoulder 41 at the juncture of said hub member and the end plate 18, and a seal 42 is provided in the bore 36 on the shoulder 41. A threaded recess or annular groove 43 is provided in the rightward side of the shoulder 41, and a hardened metal ramp member or insert 44 is threadedly received in the groove 43 having an inclined surface 45 thereon which slopes radially outwardly to the right from the shoulder 41.

An expansible service or actuating chamber 46 is formed in the friction device operating mechanism 7 between the service diaphragm 28 and the auxiliary diaphragm 34 and a service port 47 which receives the conduit 6, as previously mentioned, is provided in the intermediate plate 19 in open pressure fluid communication with the service chamber 46. An expansible emergency or parking chamber 48 is formed in the friction device operating mechanism 7 between the base wall 30 and the auxiliary diaphragm 34 and an emergency port 49 which receives the conduit 12, as previously mentioned, is provided in the end wall 30 in open pressure fluid communication with the emergency chamber 48.

A piston or control member 50 is provided with a head portion 51 having a seal 52 thereon for slidable sealing engagement with the counterbore 40, and stepped sleeve portions 53, 54 are integrally formed on said head portion and extend rightwardly therefrom. The smaller stepped portion 54 extends through the aeprture 36 in slidable sealing engagement with the seal 42 on the shoulder 41, and an abutment or shoulder 55 is formed at the juncture of the stepped portions 53, 54 for engagement with the shoulder 41. A bore 56 extends axially through the piston 40, and a cross-bore 57 is provided through the smaller stepped portion 54 connecting with the bore 56 adjacent the rightward end thereof. A plurality of wedging rollers or locking members 58 are provided in the cross-bore 57 and are movable on the inclined surface 45 of the insert member 44. A pre-loaded spring 59 is provided in the counterbore 40 biased between the piston head 51 and the shoulder 41 normally urging piston 50 leftwardly, allowing the rollers 58 to move inwardly on the ramp 45 toward their locking position.

A stepped actuator rod 60 is provided with a larger or leftward end 61 movable in the bore 39 of the hub member 37 and the bore 56 of piston 50, and a smaller or rightward working end 62 is provided on said actuator extending through the aperture 35 in the auxiliary diaphragm 34. An annular shoulder 63 is defined on the actuator 60 at the intersection of the leftward end 61 and the working end 62, and a passage 64 is provided on the periphery of said actuator from the shoulder 63 through the leftward end 61 and said passage is small enough so that the locking members 58 cannot become wedged or locked therein. A force receiving plate 65 is provided on the periphery of the working end 62 between the shoulder 63 and the leftward side of the diaphragm 34, and another force receiving plate 66 is provided on the periphery of said working end on the rightward side of the diaphragm 34, and said force receiving plates are maintained in engagement with the opposite sides of said diaphragm by a spacer element 67 threadedly received on said working end. The force receiving plates 65, 66 also form a fluid pressure tight seal with the diaphragm 34 about the aperture 35 to prevent pressure fluid flow between the chambers 46 and 48 through said aperture. A friction device actuator or push rod assembly 68 extends coaxially through the venting aperture 22 of the end plate 17, and a return spring 69 is interposed between the end plate wall 21 and said push rod serving to normally bias said push rod to an inoperative position wherein the diaphragm 28 is urged leftwardly into abutting engagement with the spacer element 67, and the auxiliary diaphragm 34 is urged into its inoperative position in abutting engagement with the boss 31.

It should be understood that the pre-load spring 59 normally urges the piston 50 leftwardly, thereby serving to move the rollers 58 inwardly on the ramp 45 into wedging or locking engagement between the insert 44 and the actuator 60 to prevent movement of the actuator leftwardly, but the rollers 58 do not prevent movement of the actuator 60 rightwardly. To complete the description of the friction device operating mechanism 7, it should be noted that an expansible fluid pressure chamber 70 is defined by hub members 37 and the piston head 51 between the counterbore 40 and the periphery of the actuator 60, and the fluid pressure chamber 70 is in open pressure fluid communication with the fluid pressure chamber 48 through the passage 64. It should also be noted that the area of the head portion 51 of the piston 50 across the seal 52 minus the area of the bore 56 defines an effective fluid pressure responsive area $A_1$ which is predeterminately greater than the effective area $A_2$ defined by the area of the smaller stepped portion 54 of said piston across the seal 42 minus the area of bore 56.

In the operation with the component parts of the system 1 and the friction device operating mechanism 7 positioned as shown in FIGS. 1 and 2, assume that normal vehicle operating conditions exist wherein the storage reservoir 5 is charged with fluid pressure from the compressor 2. If the operator desires to make a normal service application to energize the friction device and effect vehicle deceleration or a complete stop, a force is applied to the application valve 3 which meters fluid pressure from the reservoir 5 through conduits 4 and 6 to the service port 47 of the friction device operating mechanism 7 into the service chamber 46. The fluid pressure so established in the chamber 46 acts on the effective fluid pressure responsive area of the service diaphragm 28 creating a force to move the service diaphragm 28 and the push rod assembly 68 rightwardly to a protracted or operative position against the compressive force of the return spring 69, thereby actuating said push rod to rotate the slack adjustor 15 and energize the friction device (not shown). The fluid pressure in the chamber 46 also acts on the leftward side of the diaphragm 34 to maintain said diaphragm in its inoperative position abutingly engaging the boss 31 so that the locking members 58 and actuator 60 are inoperative or disabled and have no affect on the normal actuation of the friction device operating mechanism 7. When the desired breaking effect is obtained, the force is removed from the application valve 3 and the fluid pressure returns to said application valve from the chamber 46 through the conduit 6 to be exhausted to atmosphere and the return spring 69 urges the push rod 68 leftwardly to its retractive or inoperative position at rest against the spacer element 67.

In the event an emergency or parking application is desired, the rotatable passage means 13 of the charging valve 10 is rotated counterclockwise to permit pressure fluid communication between the inlet 9 and the outlet 11, thereby serving to provide pressure fluid flow through the conduits 8 and 12 into the emergency port 49 and the emergency chamber 48. The fluid pressure established in the chamber 48 acts on the effective fluid pressure responsive area of the diaphragm 34 to urge said diaphragm rightwardly, which carries the actuator 60 connected thereto rightwardly toward its operative or energized position. Since the spacer element 67 on the working end 62 of the actuator 60 is in abutting engagement with the diaphragm 28, this rightward movement of the diaphragm 34 and the actuator 60 serves to mechanically drive the diaphragm 28 and the push rod assembly 68 toward their operative or energized positions to rotate the slack adjustor 15 and energize the friction device (not shown). The fluid pressure in chamber 48 acts on the effective area $A_2$ to develop a force $F_2$ urging the piston 50 leftwardly and the fluid pressure also passes through the passage 64 into the chamber 70 and acts on the effective area $A_1$ of the piston 50 to develop a force $F_1$ serving to move said piston rightwardly. When the force $F_1$ is sufficient to overcome the opposing force $F_2$ plus the force of the preloaded spring 59, the piston 50 is moved rightwardly, which permits the roller members 58 to move outwardly on the inclined surface 45 to disengage or unwedge the roller members 58 from between the insert 44 and the actuator 60. When the piston 50 and roller members 58 are in this position, it is obvious that the actuator 60 is free to move either rightwardly or leftwardly; however, should the fluid pressure in the chambers 48 and 70 fall below a predetermined value, due to leak-off or to the exhaustion of fluid pressure from the emergency chamber 48 by the charging valve 10, the force of the pre-loaded spring 59 plus the force $F_2$ serves to move the piston 50 leftwardly against the force $F_1$, thereby moving the rollers 48 inwardly on the inclined surface or ramp 45 to become engaged between the actuator 60 and the insert 44. This predetermined fluid pressure is greater than that required for a braking application so that when the roller members 58 move into wedging engagement with the actuator 60, the actuator is still in its energized or operative position and said actuator is prevented from moving leftwardly and the working end 62 thereof is maintained or locked in its actuated position, which maintains the push rod 68 in its operative position and prevents release of the friction device.

A release of the locking members 58 and the actuator 60 from its actuated position may be accomplished when the fluid pressure failure in the system 1 has been corrected or when it is desired to release the parking application by positioning the passage means 13 to connect the inlet and outlet 9, 11 of the charging valve 10 and increasing the fluid pressure in the reservoir 5 to a value greater than the predetermined value. In this manner, the fluid pressure in the chamber 48 and the chamber 70 may be increased above the predetermined value, serving to move the diaphragm 34 and actautor 60 rightwardly, which is not restricted or prevented by the locking members 58, and also serving to move the piston 50 rightwardly permitting the rollers 58 to move outwardly on the inclined surface 45 to a position disengaged from the actuator 60. A full application is then made to the application valve 3 which supplies fluid pressure to the service chamber 46 which is substantially equal to the fluid pressure supplied to the emergency chamber 48, and since the fluid pressure on the opposed sides of the diaphragm 34 are substantially equal, the diaphragm is in force equilibrium. Thereafter, as the fluid pressure in the chamber 48 is exhausted by turning the charging valve 10 clockwise to position the passage means 13 to connect the outlet 11 with the exhaust port 14, the fluid pressure in the chamber 46 acts on the rightward side of the diaphragm 34 to move the diaphragm 34 and the actautor 60 leftwardly toward their original positions with said diaphragm in abutting engagement with the boss 31. After the diaphragm 34 is moved to its original position, the fluid pressure in the chamber 48 and the chamber 70 is reduced below the predetermined value, and the force of the pre-loaded spring 59 plus the force of the fluid pressure in the chamber 48 acting on the effective area $A_2$ overcome the force of the fluid pressure in the chamber 70 acting on the effective area $A_1$, serving to move the piston 50 leftwardly to its original inoperative or disabled position with the rollers 58 in wedging engagement between the inclined surface 45 of the insert 44 and the actuator 60. The fluid pressure in the service chamber 46 can then be released and the compressive force of the spring 69 will urge the push rod 68 and service diaphragm 28 to their original positions with said service diaphragm in abutting engagement with the spacer element 67.

The embodiments of the invention in which an exclusive property or privilege is claimed are defined as follows:

1. A friction device operating mechanism comprising a housing having hub means and a shoulder therein, an inclined surface on said shoulder, a first diaphragm movable in said housing, a rod connected to said first diaphragm and movable therewith for operative connection with a friction device, a second diaphragm movable in said housing, a first fluid pressure chamber in said housing between said first and second diaphragms, said first diaphragm and said rod being movable in response to fluid pressure selectively subjected to said first chamber toward an operative position actuating said friction device, a second fluid pressure chamber in said housing defined by said second diaphragm and said hub means, a bore and counterbore in said hub means, annular piston means having a head portion slidable in said counterbore and an integral sleeve portion extending substantially coaxially therefrom and slidable on said shoulder, an actuator connected to said second diaphragm and slidable in said annular piston means and said bore and having a working end thereon extending through said second diaphragm for mechanical driving engagement with said first diaphragm, said actuator including fluid passage means, a plurality of locking members in said sleeve portion movable on said inclined surface and engageable with said actuator for wedging engagement therebetween to prevent the movement of said actuator in one direction, and spring means urging said piston means toward the position permitting said locking member to engage said inclined surface and said actuator and effect the wedging engagement therebetween, said second diaphragm being movable in response to fluid pressure in said second chamber to engage said actuator working end with said first diaphragm and thereafter mechanically drive said rod in a direction opposite said one direction toward the operative position, said piston means being movable in response to fluid pressure in said second chamber above a predetermined value in opposition to the force of said spring toward a position disengaging said locking members from between said actuator and said inclined surface to permit said actuator to move in the one direction, and said piston means being movable in response to fluid pressure in said second chamber below the predetermined value toward a position permitting said locking members to effect the wedging engagement between said actuator and said inclined surface to prevent movement of said actuator in the one direction and maintain said working end and said rod in the operative position.

References Cited

UNITED STATES PATENTS

| | | | |
|---|---|---|---|
| 2,759,569 | 8/1956 | Keehn | 303—89 X |
| 2,873,579 | 2/1959 | Safford | 92—28 |
| 3,011,832 | 12/1961 | Euga | 92—63 X |
| 3,151,525 | 10/1964 | Dobrikin et al. | 92—24 |
| 3,173,726 | 3/1965 | Valentine et al. | 92—27 X |
| 3,177,779 | 4/1965 | Dobrikin et al. | 92—27 X |

MARTIN P. SCHWADRON, Primary Examiner.

IRWIN C. COHEN, Assistant Examiner.

U.S. Cl. X.R.

92—63